United States Patent
Fujibayashi et al.

(10) Patent No.: US 6,947,939 B2
(45) Date of Patent: Sep. 20, 2005

(54) SYSTEM AND METHODS TO MANAGE WIDE STORAGE AREA NETWORK

(75) Inventors: Akira Fujibayashi, San Jose, CA (US); Masayuki Yamamoto, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 487 days.

(21) Appl. No.: 10/143,652

(22) Filed: May 8, 2002

(65) Prior Publication Data

US 2003/0212711 A1 Nov. 13, 2003

(51) Int. Cl.⁷ .............................................. G06F 17/30
(52) U.S. Cl. ................... 707/10; 707/2; 707/3; 707/6; 707/102; 707/104; 701/213; 370/17
(58) Field of Search .............................. 707/2, 3, 6, 10, 707/102, 104; 701/213; 370/17, 252; 709/224

(56) References Cited

U.S. PATENT DOCUMENTS

| | | | |
|---|---|---|---|
| 4,896,315 A | 1/1990 | Felker et al. | |
| 4,916,444 A | 4/1990 | King | |
| 4,939,718 A | 7/1990 | Servel et al. | |
| 5,048,009 A | 9/1991 | Conrad | |
| 5,198,805 A | 3/1993 | Whiteside et al. | |
| 5,243,592 A | 9/1993 | Perlman et al. | |
| 5,247,464 A | 9/1993 | Curtis | |
| 5,365,509 A | 11/1994 | Walsh | |
| 5,500,730 A | 3/1996 | Johnson | |
| 5,550,807 A | 8/1996 | Kuroshita | |
| 5,754,767 A | 5/1998 | Ruiz | |
| 6,643,586 B2 * | 11/2003 | Allen et al. ............... 701/213 |
| 2002/0156984 A1 * | 10/2002 | Padovano .................. 711/148 |
| 2002/0169869 A1 * | 11/2002 | Fainer et al. .............. 709/224 |
| 2002/0191602 A1 * | 12/2002 | Woodring et al. .......... 370/389 |
| 2003/0114981 A1 * | 6/2003 | Allen et al. ............... 701/213 |
| 2003/0126360 A1 * | 7/2003 | Camble et al. ............. 711/114 |
| 2003/0208589 A1 * | 11/2003 | Yamamoto ................. 709/224 |
| 2004/0073676 A1 * | 4/2004 | Honma et al. ............. 709/226 |

* cited by examiner

*Primary Examiner*—Thuy N. Pardo
(74) *Attorney, Agent, or Firm*—Squire, Sanders & Dempsey, L.L.P.

(57) ABSTRACT

A system comprises a topology repository, a SAN manager, and a discovery list. The topology repository stores configuration data of a SAN. The SAN manager, coupled to the repository and discovery list, receives configuration data in response to a request for configuration data from each component in the SAN according to the discovery list; compares the received data to data stored in the repository; updates the repository with the received data if the received data differs from the stored data; and outputs data stored in the repository, the outputted data showing distance between a switch and components coupled to the switch.

20 Claims, 14 Drawing Sheets

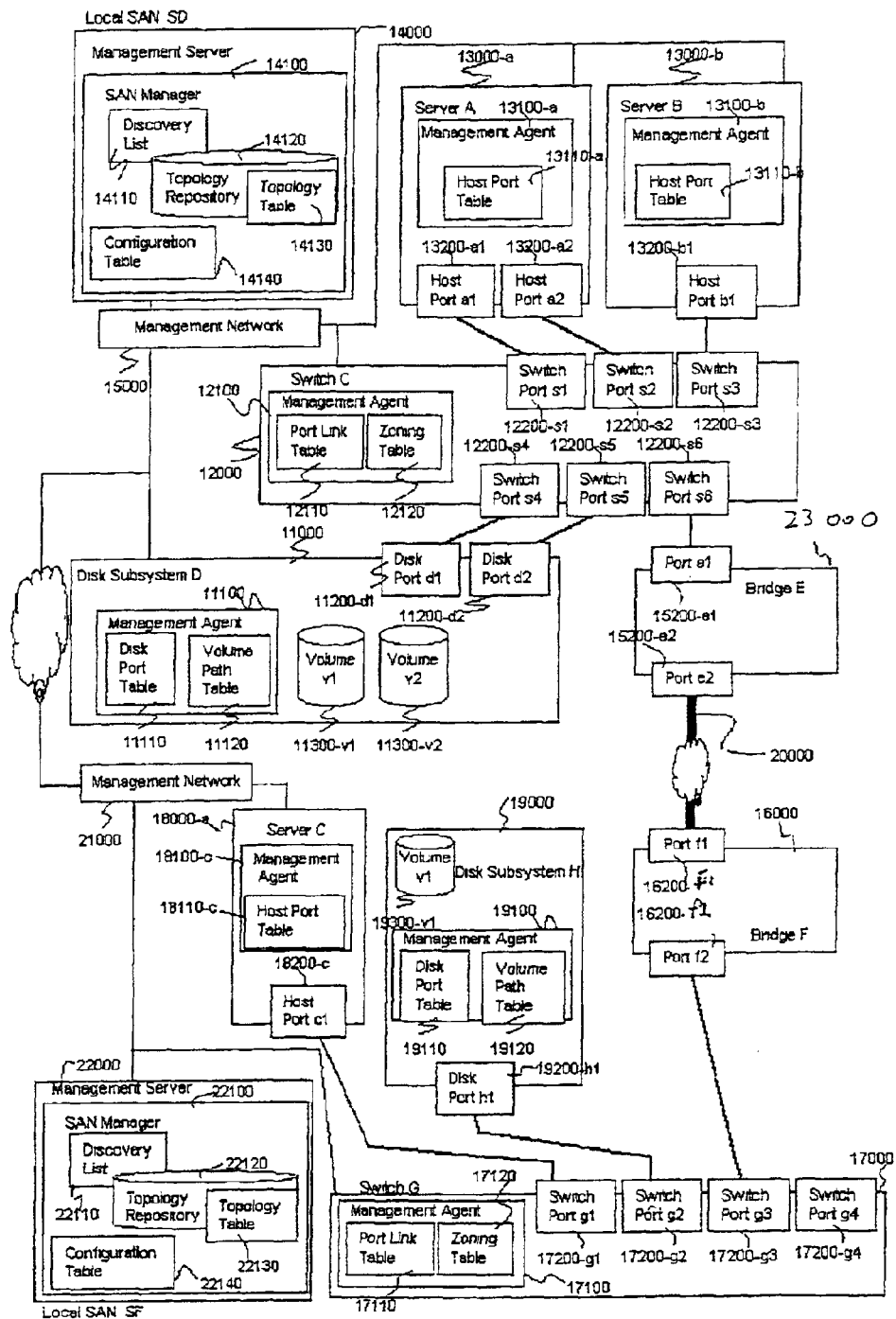

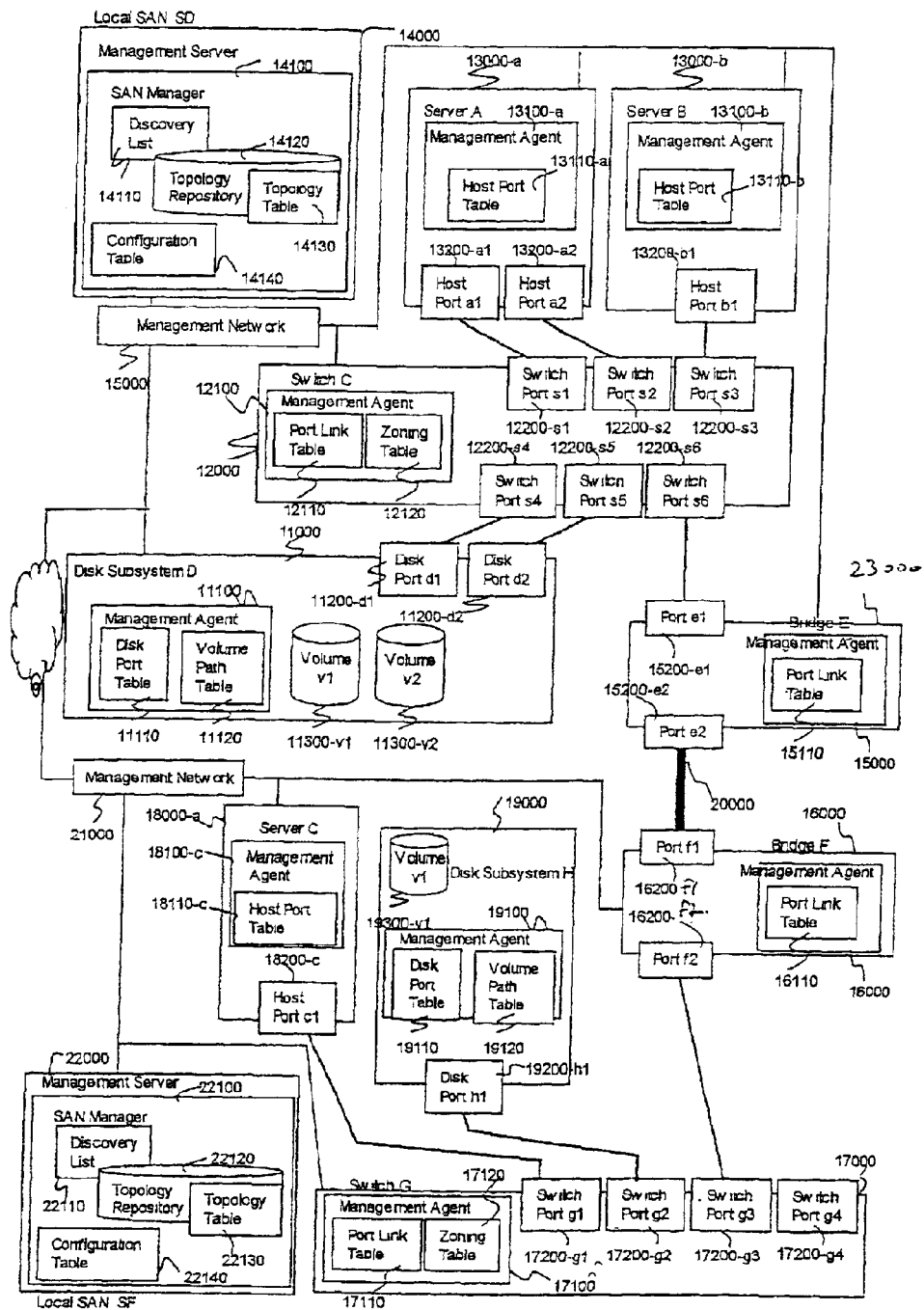
Fig. 1-1 Overall Diagram of Wide SAN Management System

Fig.2: Disk Port Table 11110 in Disk Subsystem D 11000

| Disk Port ID | WWN |
|---|---|
| d1 | WWNd1 |
| d2 | WWNd2 |
| 210 | 220 |

Fig.2-1: Disk Port Table 19110 in Disk Subsystem H 19000

| Disk Port ID | WWN |
|---|---|
| h1 | WWNh1 |

Figure 3: Volume Path Table 11120 in Disk Subsystem D 11000

| Path ID | Disk Port ID | Volume ID | SCSI ID | SCSI LUN |
|---|---|---|---|---|
| 1 | d1 | v1 | 2 | 1 |
| 2 | d1 | v2 | 3 | 1 |
| 3 | d2 | v2 | 4 | 2 |
| 310 | 320 | 330 | 340 | 350 |

Figure 4: Volume Path Table 19120 in Disk Subsystem H 19000

| Path ID | Disk Port ID | Volume ID | SCSI ID | SCSI LUN |
|---|---|---|---|---|
| 1 | h1 | v1 | 5 | 1 |

Figure 5: Port Link Table 12110 in FC Switch C 12000

| Switch Port ID | Switch Port WWN | Link WWN | Dist. | Res.time |
|---|---|---|---|---|
| s1 | WWNs1 | WWNa1 | Short | Short |
| s2 | WWNs2 | WWNa2 | Short | Short |
| s3 | WWNs3 | WWNb1 | Short | Short |
| s4 | WWNs4 | WWNd1 | Short | Short |
| s5 | WWNs5 | WWNd2 | Short | Short |
| s6 | WWNs6 | WWNg3 | Far | Long |

510　520　530　540　550

Figure 5-1: Port Link Table 17110 in FC Switch G 17000

| Switch Port ID | Switch Port WWN | Link WWN | Dist. | Res.time |
|---|---|---|---|---|
| g1 | WWNg1 | WWNc1 | Short | Short |
| g2 | WWNg2 | WWNh1 | Short | Short |
| g3 | WWNg3 | WWNs6 | Far | Long |
| g4 | WWNg4 | N/A | N/A | N/A |

Figure 5-2: Port Link Table 12110 in FC Switch C 12000

| Switch Port ID | Switch Port WWN | Link WWN | Dist. | Res.time |
|---|---|---|---|---|
| s1 | WWNs1 | WWNa1 | Short | Short |
| s2 | WWNs2 | WWNa2 | Short | Short |
| s3 | WWNs3 | WWNb1 | Short | Short |
| s4 | WWNs4 | WWNd1 | Short | Short |
| s5 | WWNs5 | WWNd2 | Short | Short |
| s6 | WWNs6 | WWNe1 | Short | Short |

Figure 5-3: Port Link Table 17110 in FC Switch G 17000

| Switch Port ID | Switch Port WWN | Link WWN | Dist. | Res.time |
|---|---|---|---|---|
| g1 | WWNg1 | WWNc1 | Short | Short |
| g2 | WWNg2 | WWNh1 | Short | Short |
| g3 | WWNg3 | WWNf2 | Short | Short |
| g4 | WWNg4 | N/A | Short | Short |

Figure 6: Zoning Table 12120 in FC Switch C 12000

| Zone ID | Switch Port ID List |
|---|---|
| 1 | (s1,s2,s4) |
| 2 | (s3,s5,s6) |

610   620

Figure 6-1: Zoning Table 17120 in FC Switch G 17000

| Zone ID | Switch Port ID List |
|---|---|
| 1 | (s1, s2, s3) |

Figure 7a: Host Port Table 13110-a in Server A 13000-a

| Host Port ID | WWN | SCSI ID |
|---|---|---|
| a1 | WWNa1 | 2 |
| a2 | WWNa2 | 3 |

710   720   730

Figure 7b: Host Port Table 13110-b in Server B 13000-b

| Host Port ID | WWN | SCSI ID |
|---|---|---|
| b1 | WWNb1 | 4 |

Figure 7c: Host Port Table 18110-c in Server C 18000-c

| Host Port ID | WWN | SCSI ID |
|---|---|---|
| c1 | WWNc1 | 5 |

Figure 8a: LUN Binding Table 13120-a in Server A 13000-a

| Binding ID | SCSI ID | LUN | Inquiry Information |
|---|---|---|---|
| 1 | 2 | 1 | Vendor D, Storage D, Volume ID 1 |
| 2 | 3 | 1 | Vendor D, Storage D, Volume ID 2 |

810  820  830  840

Figure 8b: LUN Binding Table 13120-b in Server B 13000-b

| Binding ID | SCSI ID | LUN | Inquiry Information |
|---|---|---|---|
| 1 | 4 | 2 | Vendor D, Storage D, Volume ID 2 |
| 2 | 5 | 1 | Vendor D, Storage H, Volume ID 1 |

Figure 8c: LUN Binding Table 18120-c in Server C 18000-c

| Binding ID | SCSI ID | LUN | Inquiry Information |
|---|---|---|---|
| 1 | 5 | 1 | Vendor D, Storage H, Volume ID 1 |
| 2 | 4 | 2 | Vendor D, Storage D, Volume ID 2 |

Figure 9: Port Link Table 15110 in Bridge E 23000

| Bridge Port ID | Bridge Port Address | Link Address |
|---|---|---|
| e1 | WWNe1 | WWNs6 |
| e2 | Addr.e2 | Addr.f1 |

510  520  530

Figure 9-1: Port Link Table 16110 in Bridge F 16000

| Bridge Port ID | Bridge Port Address | Link Address |
|---|---|---|
| f1 | Addr.f1 | Addr.e2 |
| f2 | WWNf2 | WWNg3 |

Figure 9-2: Port Link Table 15110 in Bridge E 23000

| Bridge Port ID | Bridge Port Address | Link Address |
|---|---|---|
| e1 | ——— | WWNs6 |
| e2 | Addr.e2 | Addr.f1 |

Figure 9-3: Port Link Table 16110 in Bridge F 16000

| Bridge Port ID | Bridge Port Address | Link Address |
|---|---|---|
| f1 | Addr.f1 | Addr.e2 |
| f2 | ——— | WWNg3 |

Figure 10: Discovery List 14110,22110 in Management Server 14000, 22000

| Local SAN ID | Discovery ID | Device Type | Device Information | IP Address | Area/Global position |
|---|---|---|---|---|---|
| 1 | 1 | Server | Vendor A, Server A | 100.100.100.100 | |
| 1 | 2 | Server | Vendor B, Server B | 100.100.100.101 | |
| 1 | 3 | FC Switch | Vendor C, Switch C | 100.100.100.102 | SD<br>Latitude xxxxN<br>Longitude xxxxW |
| 1 | 4 | Disk Subsystem | Vendor D, Storage D | 100.100.100.103 | |
| 2 | 1 | Server | Vendor A, Server C | 120.100.100.105 | |
| 2 | 2 | Disk Subsystem | Vendor D, Storage H | 120.100.100.106 | |
| 2 | 3 | FC Switch | Vendor C, Switch G | 120.100.100.107 | SF<br>Latitude xxxxN<br>Longitude xxxxW |

1060  1010  1020  1030  1040  1050

Figure 10-1: Discovery List 14110,22110 in Management Server 14000, 22000

| Local SAN ID | Discovery ID | Device Type | Device Information | IP Address | Area/Global position |
|---|---|---|---|---|---|
| 1 | 1 | Server | Vendor A, Server A | 100.100.100.100 | |
| 1 | 2 | Server | Vendor B, Server B | 100.100.100.101 | |
| 1 | 3 | FC Switch | Vendor C, Switch C | 100.100.100.102 | SD Latitude xxxxN Longitude xxxxW |
| 1 | 4 | Disk Subsystem | Vendor D, Storage D | 100.100.100.103 | |
| 1 | 5 | Bridge | Vendor E, Bridge E | 100.100.100.104 | |
| 2 | 1 | Server | Vendor A, Server C | 120.100.100.105 | |
| 2 | 2 | Disk Subsystem | Vendor D, Storage H | 120.100.100.106 | |
| 2 | 3 | FC Switch | Vendor C, Switch G | 120.100.100.107 | SF Latitude xxxxN Longitude xxxxW |
| 2 | 4 | Bridge | Vendor E, Bridge F | 120.100.100.108 | |

1060  1010  1020  1030  1040  1050

Figure 11-1: Topology Table 14130 in Management Server 14000

| Server | | | Interconnect | | | | | | | | | Storage | | |
|---|---|---|---|---|---|---|---|---|---|---|---|---|---|---|
| Server Name | Binding ID | Host Port ID | Switch Name | Switch Port ID | Switch Name | Switch Port ID | Dst/Area | Switch Name | Switch Port ID | Switch Name | Switch Port ID | Dst/Area | Storage Name | Dsk Port ID | Volume ID |
| Server A | LU1 | a1 | Switch C | s1 | Switch C | s4 | Short/SD | | | | | | Storage D | d1 | v1 |
| Server A | LU2 | a2 | Switch C | s2 | Switch C | s4 | Short/SD | | | | | | Storage D | d1 | v2 |
| Server B | LU1 | b1 | Switch C | s3 | Switch C | s5 | Short/SD | | | | | | Storage D | d2 | v1 |
| Server B | LU2 | b1 | Switch C | s3 | Switch C | s6 | Far/SD | Switch G | g3 | Switch G | g2 | Short/SF | Storage H | h1 | v1 |
| Server C | LU1 | c1 | Switch G | g1 | Switch G | g2 | Short/SF | | | | | | Storage H | h1 | v1 |
| Server C | LU2 | c1 | Switch G | g1 | Switch G | g3 | Far/SF | Switch C | s6 | Switch C | s5 | Short/SD | Storage D | d2 | v1 |

1110　1112　1113　1120　1121　1122　1123　1124　1125　1130　1131　1132　1133

Figure 11-2: Topology Table 14130 22130 in Management Server 14000 22000

| Server | | | Interconnect | | | | | | | | | | | | Storage | | |
|---|---|---|---|---|---|---|---|---|---|---|---|---|---|---|---|---|---|
| Server Name | Binding ID | Host Port ID | Switch Name | Switch Port ID | Switch Name | Switch Port ID | Bridge Port | Bridge Port | Bridge Port | Bridge Port | Switch Name | Switch Port ID | Switch Name | Switch Port ID | Storage Name | Disk Port ID | Volume ID |
| Server A | LU1 | a1 | Switch C | s1 | Switch C | s4 | | | | | Switch C | s1 | Switch C | s4 | Storage D | d1 | v1 |
| Server A | LU2 | a2 | Switch C | s2 | Switch C | s4 | | | | | Switch C | s2 | Switch C | s4 | Storage D | d1 | v2 |
| Server B | LU1 | b1 | Switch C | s3 | Switch C | s5 | | | | | Switch C | s3 | Switch C | s5 | Storage D | d2 | v1 |
| Server B | LU2 | b1 | Switch C | s3 | Switch C | s5 | Bridge E, e1 | Bridge E, e2 | Bridge F, f1 | Bridge F, f2 | Switch G | g3 | Switch G | g2 | Storage H | h1 | v1 |
| Server C | LU1 | c1 | Switch G | g1 | Switch G | g3 | | | | | Switch G | g1 | Switch C | s5 | Storage H | h1 | v1 |
| Server C | LU2 | c1 | Switch G | g1 | Switch G | g3 | Bridge F, f2 | Bridge F, f1 | Bridge E, e2 | Bridge E, e1 | Switch C | s6 | Switch C | s5 | Storage D | d2 | v1 |

1126  1127

Figure 12: An Example of Configuration Table (14140, 22140)
in Management Server (14000, 22000)

| Device Name | Configuration Type | Configuration Detail ||
|---|---|---|---|
| | | ID | Detail |
| Switch C | Zoning | 1 | s1,s2,s4 |
| Switch C | Zoning | 2 | s3,s5,s6 |
| Switch G | Zoning | 1 | s1,s2,s3 | ns
SYSTEM AND METHODS TO MANAGE WIDE STORAGE AREA NETWORK

TECHNICAL FIELD

This invention relates generally to networks, and more particularly, but not exclusively, provides a system and methods for managing a wide storage area network.

BACKGROUND

A Storage Area Network (SAN) is a network of storage disks and may also include switches, servers, and disk subsystems. A benefit of SANs is storage consolidation, which enables the sharing of a single or multiple large disk subsystems across a large number of servers and/or applications. Another benefit of SANs is that a plurality of SANs may be interconnected with bridges, such as a WDM device, and located at different geographic locations to form Wide SANs. For example, a SAN in San Francisco may be communicatively coupled to a SAN in San Diego.

SANs and Wide SANs are managed using SAN management software. An important feature of conventional SAN management software is automatic discovery of all SAN devices, such as servers, switches, and disk subsystems, in a SAN. SAN management software also stores a topology of the discovered SAN devices. Therefore, a new system and method for managing SANs is needed.

SUMMARY

The present invention provides a system for correctly recognizing SAN topology. Conventional SAN management software cannot recognize geographic distance between devices, such as bridges. Accordingly, in a situation in which a bridge is between two geographically separated SANs, an IT administrator may inadvertently set up a zone among the two geographically separated SANs because the management software doesn't recognize the geographic difference between the two SANs. This may lead to lower performance and complicated management problems.

To solve the aforementioned limitation, the system of the present invention comprises a SAN manager engine, a topology repository, a discovery list and a configuration table. The SAN manager engine communicates with management agents of devices of the SAN to retrieve configuration data from each agent. The management agents in switches store, in addition to configuration information, distance and/or response time between switch ports and target devices. The switch management agents can know distance and/or response time via IT manager manual input; measuring reply time from sending a frame from a switch to a target device; and/or receiving location data from a Global Positioning System (GPS) receiver or similar device. The SAN manager also checks configurations and warns a user if a bad configuration is discovered.

The topology repository includes data from all SAN devices as collected by the SAN manager from manager agents. The SAN manager can also generate a topology tables based on the data in the repository. The discovery list provides information on all SAN devices. The SAN manager uses the discovery list to contact management agents of the devices. The configuration history table provides historical configuration data in the SAN.

The present invention further provides methods for managing a wire storage area network. The methods comprise a topology discovery method and a configuration check method. The topology discovery method comprises discovering devices in a SAN per a discovery list; gathering data from management agents in the discovered devices; comparing the gathered data with data stored in a topology repository; if gathered data is different from stored data, copying the stored data to a configuration history table and storing the gathered data in the topology repository; and outputting the results in a graphical and/or table format. The configuration check method comprises examining the topology repository for zoning between switches separated by a long distance and displaying a warning if a zone has been set up with switches separated by a long distance.

Accordingly, the system and method advantageously provides for improved management of wide SANs.

BRIEF DESCRIPTION OF THE DRAWINGS

FIG. 1 is a block diagram illustrating a SAN in which bridges each have no management agent and uses a transparent protocol;

FIG. 1-1 is a block diagram of a wide SAN in which the bridges have management agents and uses a non-transparent protocol function;

FIGS. 2 and 2-1 are block diagrams of disk port tables from disk subsystems of the wide SAN;

FIGS. 3 and 4 are diagrams illustrating volume path tables of disk subsystems;

FIGS. 5, 5-1, 5-2, and 5-3 are diagrams of port link tables in switches;

FIG. 6 and FIG. 6-1 are diagrams of zoning tables in FC switches;

FIG. 7a, FIG. 7b, and FIG. 7c are diagrams showing host port tables in servers;

FIG. 8a, FIG. 8b, and FIG. 8c are diagrams showing Logical Unit Number (LUN) Binding tables in servers;

FIG. 9 and FIG. 9-1 are diagrams of port link tables in bridges of FIG. 1 using a non-transparent protocol;

FIG. 9-2 and FIG. 9-3 are diagrams of port link tables in bridges of FIG. 1-1 using a transparent protocol;

FIGS. 10 and 10-1 are diagrams illustrating a discovery list in a management server;

FIG. 11-1 is a diagram showing a topology table in a management server 14000 in a wide SAN having bridges using a transparent protocol;

FIG. 11-2 is a diagram showing a topology table in a wide SAN having bridges using a non-transparent protocol;

FIG. 12 is an example of a configuration table in a server; and

DETAILED DESCRIPTION OF THE ILLUSTRATED EMBODIMENTS

Figures 13A, 13B:
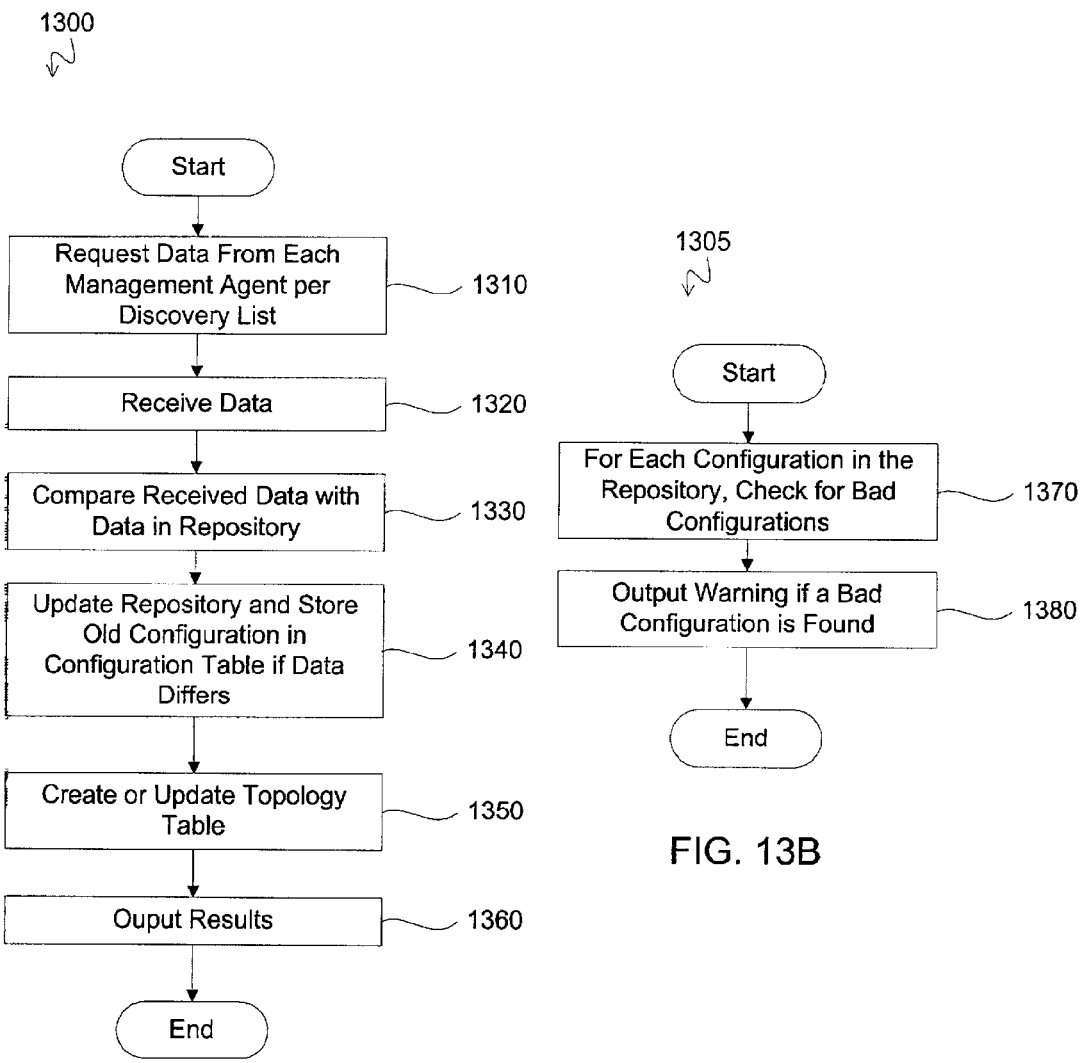
FIGS. 13A and 13B are flowcharts illustrating methods for managing a wide SAN.

The following description is provided to enable any person skilled in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

FIG. 1 is a block diagram illustrating a SAN in which a bridge has no management agent and uses a transparent protocol. The SAN includes a local SAN in San Diego ("Local SAN SD") and a local SAN in San Francisco ("Local SAN SF"). The Local SAN SD comprises a disk subsystem D 11000; a Switch C 12000; a server 13000; a management server 14000; management network 15000; and a bridge E 23000. The management network 15000 is used for communicating with Management Server 14000 and all the SAN Devices to exchange the configuration tables. Network 15000 may use any type of protocol, such as Fibre Channel, SCSI, FC over IP, etc.

Disk subsystem D 11000 comprises a management agent 11100; volumes 11300(*v*1 and *v*2); and disk ports 11200(*d*1 and *d*2). Management agent 11100 manages the configuration of the disk subsystem 11000. Agent 11100 also has two tables including a Disk Port Table (11110) and Volume Path Table (11120). These tables are in further detail below. Disk ports 11200 include data connection ports using a fibre channel protocol between servers 13000 and disk subsystem 11000. In an alternative embodiment of the invention, each disk port 11200 uses a protocol such as SCSI, FC over IP, or any other protocol. Volume 11300(*v*1 and *v*2) includes volumes that are exported to the servers 13000. The volume 11300 may comprise a single physical disk drive, or multiple disk drives where the data is striped and managed by a disk array controller, or any other physical structure.

Switch 12000 is an interconnect device between servers 13000 and disk subsystem 11000. In an embodiment of the invention, there is at least one switch that supports a zoning function in a SAN. The switch 12000 may use any communication protocol. The switch 12000 comprises a management agent 12100 and switch ports 12200(*s*1–*s*6). Agent 12100 manages configuration of switch 12000. The agent 12100 includes two tables including a Port Link Table 12110 and a Zoning Table 12120 as will be discussed in further detail below. Switch Port 12200 is a data interconnection port between servers 13000 and disk subsystem 11000. There is at least one switch port 12200 in a switch, and any connection protocol, such as Fibre Channel, SCSI, FC over IP, etc. can be used.

Servers 13000(*a* and *b*) are application servers for use in a SAN. The servers 13000 each comprise management agents 13100(*a* and *b*); and host ports 13200(*a*1, *a*2 and *b*1). The agents 13100 are located in servers 13000 and manage the configuration of the servers 13000. In addition, these agents 13100 each have a Host Port Table 13110, which will be discussed in further detail below. Host Ports 13200(*a*1, *a*2, *b*1) are data connection ports between servers 13000 and disk subsystem 11000. There is at least one host port in each server, and each host port 13200 uses a connection protocol, such as Fibre Channel, SCSI, FC over IP, or any other protocol. In an embodiment, Server 13000*a* has 2 Fibre Channel host ports, 13200-*a*1 and 13200-*a*2 and Server 13000*b* has 1 Fibre Channel host port 13200-*b*1.

Management Server 14000 is for management use in the SAN. The management server 14000 comprises a SAN manager 14100 that communicates with all the Management Agents, such as agents 11100, 12100, 13100 and 15100 (in FIG. 1-1), in a SAN to get the configuration information via Management Network 15000. In addition, SAN manager 14100 communicates with SAN manager 22100 to share data between their respective topology repositories 14120 and 22120. The SAN manager 14100 also includes a topology repository 14120, a discovery list 14110 and a configuration table 14140. The repository 14120 stores all table data from the SAN devices such as Servers, Switches and Disk Subsystems (from both Local SAN SD and Local SAN SF). The discovery list, 14110, configuration table 14140, and the topology repository 14120 will be discussed in further detail below.

Management Network 15000 is a network for communicating with Management Servers 14100 and all the SAN Devices to exchange configuration tables. The connection protocols may include Fibre Channel, SCSI, FC over IP, or any other protocol.

Bridge 15000 is an interconnect device between different protocol networks. The bridge 15000 comprises bridge ports 15200(*e*1 and *e*2) that can use any protocol, such as Fibre Channel, SCSI, FC over IP, etc.

Interconnect 20000 is used for long distance communication between bridges 23000 and 16000. Interconnect 20000 can use any protocol. SAN managers 14100 and 22100 can both recognize the distance between bridges 23000 and 16000 and represent the interconnection as a "cloud" or by simply displaying "Long Distance."

Local SAN SF is substantially similar to Local SAN SD and includes a Server C 18000 having a management agent 18100 (having a host port table 18110) and a host port 18200; a disk subsystem H 19000 having a management agent 19100 (having a disk port table 19110 and volume path table 19120), a volume 19300, and a disk port 19200; a bridge 16000 having ports 16200-*f*1 and 16200-*f*2; a management server 22000 having a SAN manager 22100 (including a discovery list 22110, topology repository 22120, and configuration table 22140); and Switch G 17000 comprising a management agent 17120 (having a port link table 17110 and zoning table 17120 ) and ports 17200 (*g*1–*g*4).

The components of Local SAN SF are substantially similar to the components of Local SAN SD and therefore operate in a substantially similar way. Via management network 21000, management server 22000 is coupled to server 18000, switch 17000 and components of Local SAN SD. In addition, bridge 16000 is coupled to switch port 17200-*g*3 of switch 17000 via port 16200-*f*2; disk subsystem 19000 is coupled to switch port 17200-*g*2 via disk port 19200-*h*1; and server 18000 is coupled to port switch 17200-*g*1 via host port 18200-*c*.

FIG. 1-1 is a block diagram of a wide SAN in which the bridges have management agents and use a non-transparent protocol function. The wide SAN of FIG. 1-1 is substantially similar to the wide SAN of FIG. 1 except that bridge 23000 and 16000 each include a management agent 15000 and 16000 respectively. Each management agent 15000 and 16000 each include a port link table 15110 and 16110 respectively. The management agents 23000 and 16000 each manage the respective configurations of bridges 23000 and 16000 respectively. Management agents 16000 and 23000 and their respective port link tables 16110 and 15110 will be discussed in further detail below.

FIGS. 2 and 2-1 are diagrams of disk port tables 11110 and 19110 of disk subsystem 11000 and 19000 respectively. These tables 11110 and 19110 provide information regarding disk ports in a disk subsystem. These tables each have two columns including a disk port ID (210), which is the name for each disk port; and WWN (220), which is a unique identifier for each disk port. When using a fibre channel protocol, WWN (220) stores a World Wide Name for each disk port.

FIGS. 3 and 4 are diagrams illustrating the volume path tables 11120 and 19120 in disk subsystems 11000 and 19000 respectively. These tables 11120 and 19120 provide information of the data I/O path from disk ports to volumes, referred to as "Volume Path" or simply "Path". These tables each have five columns including: Path ID (310), which is the name for the path; Disk Port ID (320), which is the Disk Port ID attached to the path; Volume ID (330), which is the name for the volume attached to the path; SCSI ID (340), which is the SCSI ID attached to the path (IT administrators apply this value to the server as the SCSI ID); and SCSI LUN (350), which is the SCSI LUN (Logical Unit Number) attached to the path (IT administrators apply this value to the server as the SCSI LUN).

FIGS. 5, 5-1, 5-2, and 5-3 are diagrams of port link tables 12110 and 17110 of Switches 12000 and 17000 respectively. FIGS. 5 and 5-1 correspond to the wide SAN of FIG. 1 while FIGS. 5-2 and 5-3 correspond to the wide SAN of FIG. 1-1. These port link tables 12110 and 17110 provide information relating to the interconnect relationship between servers and disk subsystems via switches, which are referred to as links. These tables 12110 and 17110 each has five columns, as follows:

| | |
|---|---|
| Switch Port ID (510): | This is a name for each switch port. |
| Switch Port WWN (520): | This is a unique identifier of each switch port. In a Fibre Channel protocol, a World Wide Name (WWN) is used. |
| Link WWN (530): | This shows the target device WWN connected to this switch port. This may be the host port's, other switch port's, or disk port's WWN. |
| Dist. (540): | This shows the distance between a switch port and a target device. The distance information may be quantitative as in "300 miles" or qualitative as in "far". In this embodiment, we use a qualitative value. Distance can be determined by reading attributes that were manually set in the switches by an IT administrator or by reading attributes set via a GPS receiver coupled to a switch. |
| Res. time (550): | This shows the response time to send and receive a data frame, such as a login frame, between a switch port and target device. The response time information may be quantitative as in "100 msec" or qualitative as in "long". In this embodiment, we use a qualitative value. |

In an embodiment of the invention, either Distance (540) or Response Time (550) is used.

FIG. 6 and FIG. 6-1 are diagrams of zoning tables 12120 and 17120 in FC Switch C 12000 and FC Switch G 17000 respectively. These tables 12120 and 17120 provide zoning configuration data in switches 12000 and 17000 respectively. Tables 12120 and 17120 include a list of switch ports that make up each zone. Two switch ports in the same zone can communicate with each other, but if switch ports are located in different zones they are unable to communicate with each other. The tables 12120 and 17120 each have two columns including a Zone ID (610), which include names for each zone, and a switch port ID list (620), which lists all switch ports in each zone.

FIG. 7a, FIG. 7b, and FIG. 7c are diagrams showing host port tables 13110a, 13110b and 18110c in server 13000-a, server 13000-b, server 18000-c respectively. Tables 13110a, 13110b and 18110c provide information relating to host ports in servers 13000-a, 13000-b and 18000-c respectively.

Each table has three columns, including a Host Port ID (710), which is a name for each host port; WWN (720), which is a unique identifier of each host port (when using Fibre Channel protocol, WWN stores the World Wide Name); and SCSI ID (730), which is the SCSI ID assigned to the specified Host Port by IT administrators (this ID is uniquely assigned in each server).

FIG. 8a, FIG. 8b, and FIG. 8c are diagrams showing Logical Unit Number (LUN) Binding tables 13120-a, 13120-b and 18120-c in servers 1300-a, 13000-b and 18000-c respectively. These tables 13120-a, 13120-b and 18120-c provide the information relating to the data I/O path from the host port to the SCSI Logical Unit (LU), which is referred to as "LUN Binding" or simply "Binding". These tables 13120-a, 13120-b and 18120-c each have four columns as follows:

| | |
|---|---|
| Binding ID (810): | This is the name for the binding. |
| SCSI ID (820): | This is the SCSI ID attached to the binding. |
| LUN (830): | This is the SCSI LUN attached to the binding. |
| Inquiry Information (840): | This is the information given by the LUN when servers issue a SCSI INQUIRY Command to the LUN. This information may contain vendor name, product name, and volume ID of the LUN. |

FIG. 9 and FIG. 9-1 are diagrams of port link tables 15110 and 16110 in bridges 23000 and 16000 (of FIG. 1 using a transparent protocol) respectively. FIG. 9-2 and FIG. 9-3 are diagrams of port link tables 15110 and 16110 in bridges 23000 and 16000 (of FIG. 1-1 using a non-transparent protocol) respectively. These table 15110 and 16110 provide information relating to the interconnect relationship between different protocol networks via bridges, which are referred to as "links". These tables 15110 and 16110 each have three columns including a Bridge Port ID (910), which is the nickname for each bridge port; Bridge Port Address (920), which is a unique identifier of each bridge port (in a Fibre Channel protocol, we use the World Wide Name (WWN) as the unique identifier); and Link Address (930), which is the target device address connected to this bridge port. To determine the link address in the case of transparent protocol, frames can be snooped so as to read header information including source and destination address. To determine the link address in the case of a non-transparent protocol, the WWN of a SAN device to which the bridge is linked is retrieved.

FIG. 10 is a diagram illustrating discovery list 14110, which is identical to discovery list 22110 in management server 22000. FIG. 10 corresponds to the wide SAN of FIG. 1 having transparent bridges, while FIG. 10-1 corresponds to the wide SAN of FIG. 1-1 having non-transparent bridges. These tables 14110 and 22110 provide information on all the devices in a wide SAN. SAN Manager 14000 uses this table to get the configuration information from Management Agents in the SAN devices. These tables 14110 and 22110 each have six columns as follows:

| | |
|---|---|
| Local SAN ID (1060): | This identifies the SAN that the device belongs to. |
| Discovery ID (1010): | This is the name for the target SAN device to be discovered. |
| Device Type (1020): | This column shows the device type of the entry. SAN Manager 14000 uses this column to see what kind of tables to expect to receive. |
| Device Information (1030): | This is detailed information of the target SAN device. |
| IP Address (1040): | This is the communication point of the Management Agent in a target device. In this embodiment, we suppose that SAN Manager 14000 communicates with all the SAN devices via TCP/IP. |
| Position (1050): | This shows the latitude longitude or general area where the device is located. In an embodiment, either general area information or latitude longitude information is required to recognize the distance between each SAN device if there is no distance information or response time information provided by port link tables 15110 or 16110 in switches 23000 or 16000 respectively. |

FIG. 11-1 is a diagram showing a topology table 14130 in management server 14000 in a wide SAN having bridges using a transparent protocol. FIG. 11-2 is a diagram showing a topology table 14130, which is identical to topology table 22130, in a wide SAN having bridges using a non-transparent protocol. SAN Manager (14100, 22100) creates these tables 14130 and 22130 that provide the topology of the I/O communication in a wide SAN. SAN Manager (14100, 22100) makes this table by merging the Disk Port Table (11110, 19110), Volume Path Table (11120, 19120), Port Link Table (12110, 17110), Host Port Table (13110, 18110), Discovery List (14110, 22110) and LUN Binding Table (13130, 18130). These tables each have three columns as follows:

| | |
|---|---|
| Server (1110): | This column shows the server information in a topology entry. This column has three sub-columns, which provide detail information of the server. These sub-columns are Server Name (1111), Binding ID (1112), and Host Port ID (1113). |
| Interconnect (1120): | This column shows the switch and bridge information in a topology entry. This column has four sub-columns, which provide detail information on the switch and bridge. These sub-columns are Switch Name (1121) and Switch Port ID (1122) on one side, and Switch Name (1123) and Switch Port ID (1124) on the other side. Further, there is Distance (1129) or Area (1129) information in FIG. 11-1. Further, there is Bridge Name (1125) and Bridge Port ID (1126) on one side, and Bridge Name (1127) and Bridge Port ID (1128) on the other side in FIG. 11-2. |
| Storage (1130): | This column shows the disk subsystem information in a topology entry. This column has 3 sub-columns, which provides detail information of the disk subsystem. These sub-columns are Storage Name (1131), Disk Port ID (1132), and Volume ID (1133). |

FIG. 12 is an example of configuration table 14140, which is identical to table 22140, in server 14000. These tables 14140 and 22140 provide the configuration in a SAN. SAN Manager (14100, 22100) stores the information of any SAN devices' configurations in tables 14140 and 22140. These tables are used when SAN Manager (14100, 22100) analyzes the bad configuration caused by the configuration of a zone that includes a long distance interconnect. The configuration table 14140 can also store prior configurations. These tables each have three columns as follows:

| | |
|---|---|
| Device Name (1210): | This column shows the device name. |
| Configuration type (1220): | This column shows the configuration type of devices. |
| Configuration detail (1230): | This column shows the detailed information of the configuration. This column has 2 sub-columns. ID (1231), which shows ID of the configuration and Detail (1232), which shows the detail of the configuration. |

FIGS. 13A and 13B are flowcharts illustrating methods 1300 and 1305. SAN Manager (14100 and/or 22100) can execute methods 1300 and 1305 concurrently or one at a time. First, SAN manager (14100 and/or 22100) requests (1310) data from all management agents in all SAN components. For example, SAN manager (14100 and/or 22100) can request port link table 17110 and zoning table 17120 from agent 17100 in switch 17000. Next, SAN manager (14100 and/or 22100) receives (1320) the data from the agents. The SAN manager (14100 and/or 22100) compares (1330) the received data with data already stored in the SAN manager's respective topology repository (14120 or 22120). If the data differs, the SAN manager (14100 and/or 22100) updates (1340) its associated repository (14120 or 22120) and stores (1340) old configuration data in configuration table 14140 and/or 22140. The SAN manager (14100 and/or 22100) then creates or updates (1350), if necessary, a topology table (14130 or 22130) based on the data in the repository (14120 or 22140). The SAN manager (14100 and/or 22100) then outputs the results in a graphical format showing the topology and/or in table format (e.g., displaying table 14130 or 22130). In a graphical format, long distance between bridges and/or other components can be shown as a cloud, by text indicating a long distance, or via other techniques. The method 1300 then end.

Method 1305 comprises for each configuration in Topology Repository 14120 or 22140, SAN Manager (14100 or 22100) checks (1370) for a bad configuration wherein there is a long distance connection between switches as indicated in the Configuration Table (14140, 22140), Topology table (14130, 22130) and/or Discovery list (14110, 22110). If there is a bad configuration, then the SAN Manager (14100 or 22100) outputs (1380) a warning regarding the bad configuration. The warning can include which zones and/or switches comprise the bad configuration as well as the switches locations. The method 1305 then ends.

The foregoing description of the preferred embodiments of the present invention is by way of example only, and other variations and modifications of the above-described embodiments and methods are possible in light of the foregoing teaching. For example, a GPS receiver for determining position can be replaced with a GLONASS receiver or other location-determining device. Although the network sites are being described as separate and distinct sites, one skilled in the art will recognize that these sites may be a part of an integral site, may each include portions of multiple sites, or may include combinations of single and multiple sites.

Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, comprising:
   receiving configuration data in response to a request for configuration data from each component in a wide SAN;
   comparing the received data to data stored in a repository;
   updating the repository with the received data if the received data differs from the stored data;
   outputting data stored in the repository, the outputted data showing distance between a switch and components coupled to the switch; and
   using the outputted data to re-design the configuration of the wide SAN.

2. The method of claim 1, wherein the received data includes the distance between the switch and the components coupled to the switch.

3. The method of claim 2, wherein the distance between the switch and components coupled to the switch is determined via GPS data.

4. The method of claim 2, wherein the distance between the switch and components coupled to the switch is determined via manually set distance attributes in the switch.

5. The method of claim 1, wherein the received data includes response time between the switch and the components coupled to the switch.

6. The method of claim 5, wherein the response time is calculated by periodically sending frames from the switch to the components and measuring the response time.

7. The method of claim 1, wherein the outputting outputs the data in a graphical format.

8. A method, comprising:
   receiving configuration data in response to a request for configuration data from each component in a SAN;
   comparing the received data to data stored in a repository;
   updating the repository with the received data if the received data differs from the stored data;
   outputting data stored in the repository, the outputted data showing distance between a switch and components coupled to the switch;
   checking for zones that encompass components spread over a distance greater than a pre-specified length; and
   outputting a warning if a zone encompasses components spread over a distance greater than the pre-specified length.

9. A computer-readable medium storing instructions to cause a computer to execute a method, the method comprising:
   receiving configuration data in response to a request for configuration data from each component in a wide SAN;
   comparing the received data to data stored in a repository;
   updating the repository with the received data if the received data differs from the stored data;
   outputting data stored in the repository, the outputted data showing distance between a switch and components coupled to the switch; and
   using the outputted data to re-design the configuration of the wide SAN.

10. The computer-readable medium of claim 9, wherein the received data includes the distance between the switch and the components coupled to the switch.

11. The computer-readable medium of claim 10, wherein the distance between the switch and components coupled to the switch is determined via GPS data.

12. The computer-readable medium of claim 10, wherein the distance between the switch and components coupled to the switch is determined via manually set distance attributes in the switch.

13. The computer-readable medium of claim 9, wherein the received data includes response time between the switch and the components coupled to the switch.

14. The computer-readable medium of claim 13, wherein the response time is calculated by periodically sending frames from the switch to the components and measuring the response time.

15. The computer-readable medium of claim 9, wherein the outputting outputs the data in a graphical format.

16. A computer-readable medium storing instructions to cause a computer to execute a method, the method comprising:
   receiving configuration data in response to a request for configuration data from each component in a SAN;
   comparing the received data to data stored in a repository;
   updating the repository with the received data if the received, data differs from the stored data;
   outputting data stored in the repository, the outputted data showing distance between a switch and components coupled to the switch;
   checking for zones that encompass components spread over a distance greater than a pre-specified length; and
   outputting a warning if a zone encompasses components spread over a distance greater than the pre-specified length.

17. A system, comprising:
   a topology repository capable to store configuration data of a wide SAN;
   a SAN manager, coupled to the repository, capable to receive configuration data in response to a request for configuration data from each component in the wide SAN; compare the received data to data stored in the repository; update the repository with the received data if the received data differs from the stored data; output data stored in the repository, the outputted data showing distance between a switch and components coupled to the switch; and use the outputted data to re-design the configuration of the wide SAN.

18. The system of claim 17, wherein the received data includes the distance between the switch and the components coupled to the switch.

19. The system of claim 17, wherein the received data includes response time between the switch and the components coupled to the switch.

20. A system, comprising:
   means for receiving configuration data in response to a request for configuration data from each component in a SAN;
   means for comparing the received data to data stored in a repository;
   means for updating the repository with the received data if the received data differs from the stored data; and
   means for outputting data stored in the repository, the outputted data showing distance between a switch and components coupled to the switch; and
   means for using the outputted data to re-design the configuration of the wide SAN.

* * * * *